(12) United States Patent
Sakurai et al.

(10) Patent No.: US 11,846,819 B2
(45) Date of Patent: Dec. 19, 2023

(54) CLOSURE WITH PARTITION TO FACILITATE DRAINING FLOOD WATER AWAY FROM OPTICAL FIBER CONNECTION

(71) Applicant: NIPPON TELEGRAPH AND TELEPHONE CORPORATION, Tokyo (JP)

(72) Inventors: Akira Sakurai, Musashino (JP); Hiroaki Tanioka, Musashino (JP); Hisashi Izumita, Musashino (JP); Shigekatsu Tetsutani, Musashino (JP); Yusuke Yamada, Musashino (JP); Yuta Maruo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/928,140

(22) PCT Filed: Jun. 1, 2020

(86) PCT No.: PCT/JP2020/021616
§ 371 (c)(1),
(2) Date: Nov. 28, 2022

(87) PCT Pub. No.: WO2021/245751
PCT Pub. Date: Dec. 9, 2021

(65) Prior Publication Data
US 2023/0213724 A1 Jul. 6, 2023

(51) Int. Cl.
*G02B 6/44* (2006.01)
*H02G 15/10* (2006.01)
*G02B 6/50* (2006.01)

(52) U.S. Cl.
CPC .......... *G02B 6/4446* (2013.01); *H02G 15/10* (2013.01); *G02B 6/44465* (2023.05); *G02B 6/501* (2023.05)

(58) Field of Classification Search
CPC .......................... G02B 6/4442; G02B 6/4446; G02B 6/44465; G02B 6/501; G02B 6/504; G02B 6/506; H02G 9/10; H02G 15/10
See application file for complete search history.

(56) References Cited

U.S. PATENT DOCUMENTS 5,159,155 A * 10/1992 Nishihara ............ H05K 5/0212
220/374
5,722,204 A * 3/1998 Stieb ....................... E02D 29/12
174/37

(Continued)

FOREIGN PATENT DOCUMENTS

CN 110850538 A * 2/2020
JP H01-152917 A 6/1989

OTHER PUBLICATIONS

English translation of written opinion for PCT/JP2020/021616, dated Nov. 10, 2020. (Year: 2020).*
Freeland et al., "Strain Sensing of an In-Road FTTH Field Trial and Implications for Network Reliability", Proc. of IWCS, (2018).

*Primary Examiner* — Michael Stahl
(74) *Attorney, Agent, or Firm* — Harness, Dickey & Pierce, P.L.C.

(57) ABSTRACT

An object is to provide a closure with a structure having a drainage function to eliminate water immersion into a coated optical fiber against temporary flooding and to prevent water from continuously contacting the coated optical fiber. Another object is to provide a closure with improved workability for opening and closing.
A closure according to the present invention protects a connection part that connects a coated optical fiber enclosed in a optical fiber cable with a coated optical fiber enclosed (Continued)

in a optical fiber cable. The closure includes a coated optical fiber housing that divides an interior of the closure into a first space that is on a side of a road and has a main body cable insertion hole for inserting the optical fiber cables from an exterior and a second space that is on an opposite side of the road and includes the connection part. The coated optical fiber housing has a frustum shape with two bases each open and a base with a smaller area of the two bases protruding toward the side of the road. The base with the smaller area of the two bases is a cable insertion hole for inserting the optical fiber cable from the first space into the second space and is not in contact with a bottom surface of the first space on the side of the road.

3 Claims, 7 Drawing Sheets

(56) References Cited

U.S. PATENT DOCUMENTS

| | | | | |
|---|---|---|---|---|
| 2005/0155277 | A1* | 7/2005 | Bagnall | A01M 1/106 43/113 |
| 2005/0207711 | A1* | 9/2005 | Vo | G02B 6/501 385/94 |
| 2007/0122100 | A1* | 5/2007 | Day | G02B 6/504 385/134 |
| 2007/0189694 | A1* | 8/2007 | Mullaney | G02B 6/4441 385/135 |
| 2014/0197164 | A1* | 7/2014 | Mavroeidis | H02G 9/10 220/484 |
| 2015/0084426 | A1* | 3/2015 | Wechlin | H02J 50/70 307/104 |

* cited by examiner

CLOSURE WITH PARTITION TO FACILITATE DRAINING FLOOD WATER AWAY FROM OPTICAL FIBER CONNECTION

CROSS-REFERENCE TO RELATED APPLICATIONS

This application is a 371 U.S. National Phase of International Application No. PCT/JP2020/021616, filed on Jun. 1, 2020. The entire disclosure of the above application is incorporated herein by reference.

TECHNICAL FIELD

The present disclosure relates to an optical fiber cable closure for protecting a connection part of an optical fiber enclosed in an optical fiber cable.

BACKGROUND ART

Optical fiber cables are currently installed underground and in the air to bring networks using optical fiber cables to user's homes. When such optical fiber cables are installed over a long distance and need to be extended, or when coated optical fibers to be used for users are pulled out and routed, the coated optical fibers enclosed in the optical fiber cables are pulled out and connected to each other in a closure as described in Patent Literature (PTL) 1. This closure is installed underground in a place having a certain space, such as a tunnel for communication, a manhole, or a hand hole, whereas the closure is installed in the air near a utility pole having cables attached. In both cases, the closure is installed in a large space. When coated optical fibers are in contact with water, their strength may decrease, affecting communication. Therefore, appropriate waterproof measures are taken according to the installation environment.

In recent years, to meet the ever-increasing demand for optical fiber communication, optical fiber cables may be installed not only underground or in the air as described above, but also on a road as described in Non Patent Literature (NPL) 1.

CITATION LIST

Patent Literature

PTL 1: JP 01-152917 A

Non Patent Literature

NPL 1: Strain Sensing of an In-Road FTTH Field Trial and Implications for Network Reliability, Proc. of IWCS (2018)

SUMMARY OF THE INVENTION

Technical Problem

The closure described in PTL 1 is assumed to be installed underground and not cause water immersion. Once the water immersion occurs due to degradation, water will retain in the closure and be in contact with the coated optical fibers for a long time. In addition, it takes a long time to open and close the closure. On the other hand, the closure installed in the air is easy to open and close but is not assumed to be submerged in water.

When the optical fiber cables are installed on the road, the closure used on the road may be flooded in the rain, and the closure needs to prevent water from contacting the coated optical fibers for a long time. The closure also needs to be opened and closed in as short a time as possible to eliminate obstruction of traffic during the opening and closing work, because the optical fiber cables are installed on the road.

To solve the above issues, a first object of the present invention is to provide a closure with a structure having a drainage function to eliminate water immersion into a coated optical fiber against temporary flooding and prevent water from continuously contacting the coated optical fiber. A second object is to provide a closure with improved workability for opening and closing.

Means for Solving the Problem

To achieve the above objects, a closure according to the present invention has a structure having a funnel-shaped partition placed inside and a connection part of the coated optical fiber arranged in an upper part of the partition, thus allowing easy drainage against water immersion.

Specifically, the closure according to the present invention protects a connection part that connects a coated optical fiber enclosed in an optical fiber cable with another coated optical fiber enclosed in another optical fiber cable. The closure includes a coated optical fiber housing that divides an interior of the closure into a first space that is on a side of a road and has a main body cable insertion hole for inserting the optical fiber cables from an exterior and a second space that is on an opposite side of the road and includes the connection part. The coated optical fiber housing has a frustum shape with two bases each open, a base with a smaller area of the two bases protruding toward the side of the road. The base with the smaller area of the two bases is a cable insertion hole for inserting the optical fiber cables from the first space into the second space and is not in contact with a bottom surface of the first space on the side of the road.

The interior of the closure has a two-layer structure with the coated optical fiber housing as a boundary. The first space is a space for inserting the optical fiber cable from the exterior and is allowed for water entry. That is, allowing for water entry means easy drainage, and the water entering the first space is drained out in a short time after the water recedes after flooding. On the other hand, the second space is for inserting the optical fiber cable from the first space and includes the connection part of the coated optical fibers. Since the coated optical fiber housing has a frustum shape, water entering the second space during flooding is easily drained from the cable insertion hole into the first space after the water recedes.

Further, if the second space has no air vent, no air escapes from the second space after flooding, making it difficult for water to enter the second space from the cable insertion hole into the coated optical fiber housing.

Thus, the present invention allows for providing a closure with a structure having a drainage function to eliminate water immersion into the coated optical fiber against temporary flooding and to prevent water from continuously contacting the coated optical fiber.

It is preferable that the interior of the closure be a space enclosed by a cylindrical main body with a top surface open, and a cylindrical lid for sealing the top surface of the main body, that the coated optical fiber housing have a truncated cone shape, and that the main body and the lid each have a thread that is screwed each other.

The lid is provided independently of the main body. The main body has a cylindrical shape, the lid also has a cylindrical shape, and the main body and the lid each have a thread that can be screwed. This configuration enables opening and closing of the closure in a short time during working on the road. Thus, the present invention allows for providing a closure with improved workability for opening and closing.

At this time, at least one of the main body or the lid preferably have a sealing material that adheres to the main body and the lid when the main body and the lid are screwed with each other. Providing a flexible sealing material between the main body and the lid allows for adhering to and sealing the main body and the lid.

Each invention described above can be combined as much as possible.

Effects of the Invention

The present disclosure allows for providing a closure with a structure having a drainage function to eliminate water immersion into the coated optical fiber against temporary flooding and to prevent water from continuously contacting the coated optical fiber. Further, the present disclosure allows for providing a closure with improved workability for opening and closing.

DESCRIPTION OF EMBODIMENTS

Embodiments of the present disclosure will be described with reference to the accompanying drawings. The embodiments described below are examples of the present disclosure, and the present disclosure is not limited to the embodiments described below. Constituent elements with the same reference signs in the description and the drawings are assumed to indicate the same constituent elements.

Figure 1:
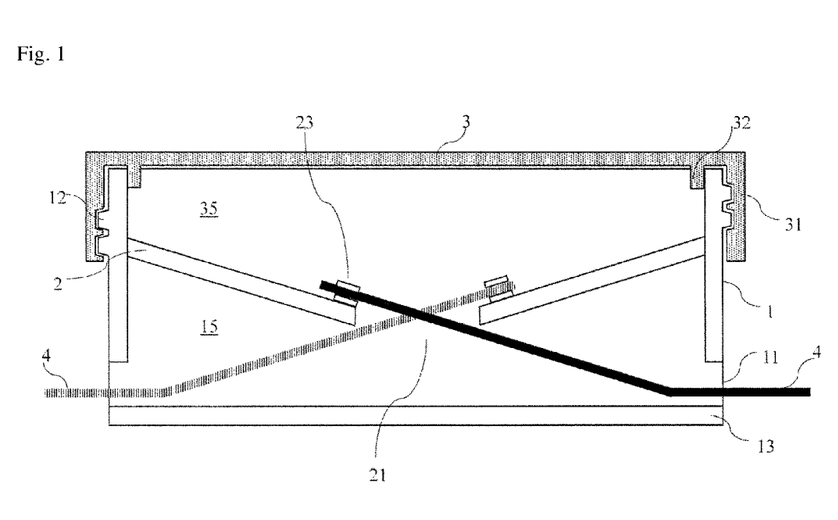
FIG. 1 is a longitudinal sectional view of a closure according to the present disclosure.
Figure 2:
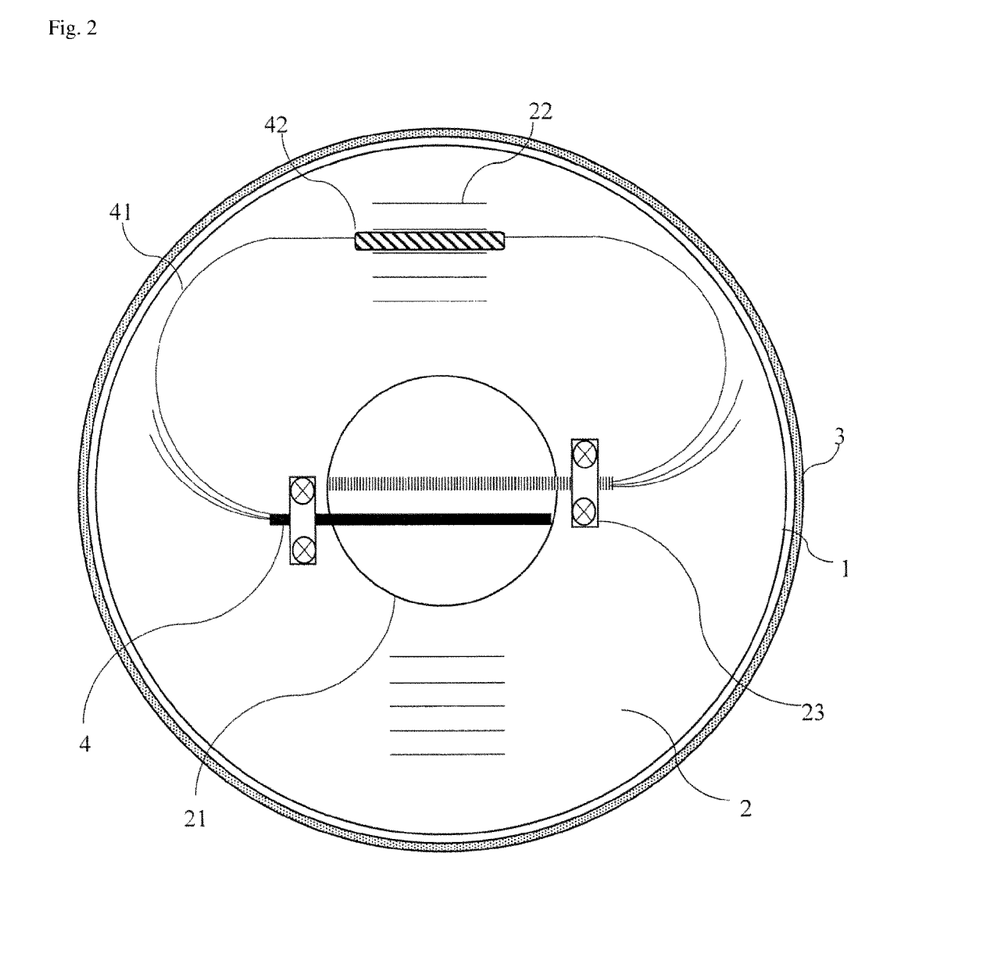
FIG. 2 is a cross-sectional view of the closure according to the present disclosure.
Figure 3:
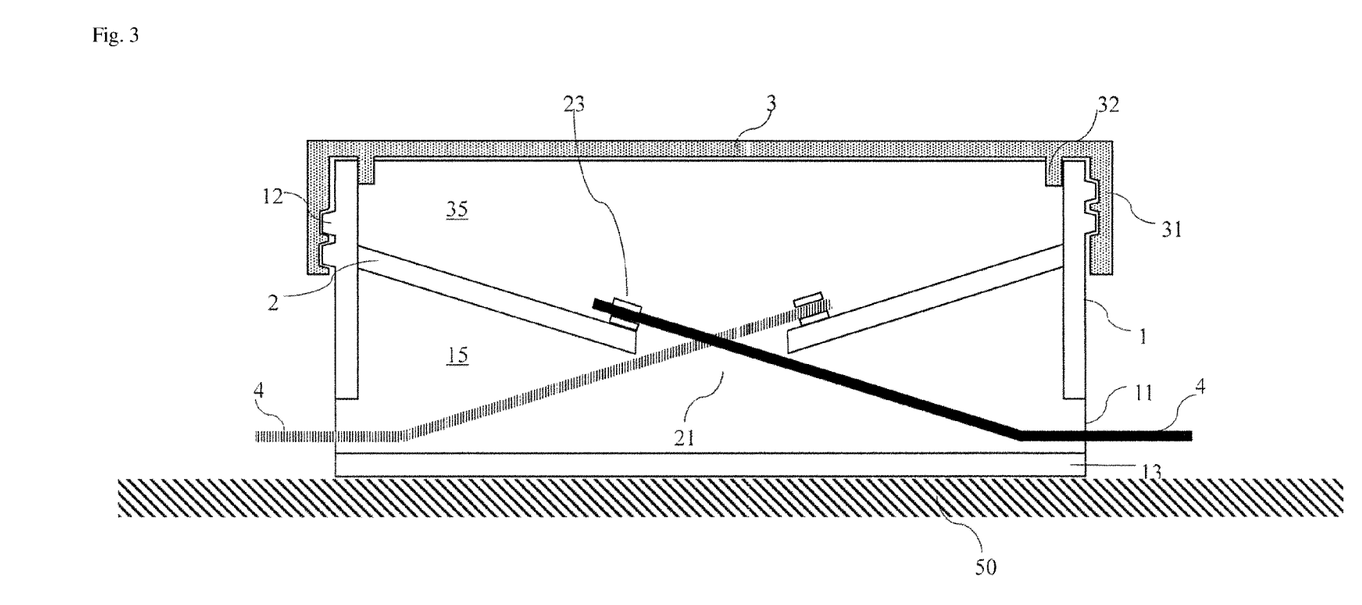
FIG. 3 is a longitudinal sectional view of the closure according to the present disclosure illustrating a form in which the closure is installed on a road.

FIGS. 1 to 7 are diagrams illustrating a closure according to the present embodiment. FIG. 1 is a longitudinal sectional view (cross-sectional view in a plane perpendicular to the road) of the closure. FIG. 2 is a cross-sectional view (cross-sectional view in a plane parallel to the road) of the closure. FIG. 3 is a longitudinal sectional view of the closure installed on a road 50.

The closure protects a connection part 42 that connects a coated optical fiber 41 enclosed in an optical fiber cable 4 with another coated optical fiber 41 enclosed in another optical fiber cable 4. The closure includes a coated optical fiber housing 2 that divides an interior of the closure into a first space 15 that is on a side of the road 50 and has a main body cable insertion hole 11 for inserting the optical fiber cables 4 from an exterior and a second space 35 that is on an opposite side of the road 50 and includes the connection part 42. The coated optical fiber housing 2 has a frustum shape with two bases (25, 26) each open, the base 26 with a smaller area of the two bases (25, 26) protruding toward the side of the road 50. The base 26 with the smaller area of the two bases (25, 26) is a cable insertion hole 21 for inserting the optical fiber cables 4 from the first space 15 into the second space 35 and is not in contact with a bottom surface 13 of the first space 15 on the side of the road 50. The relationship between the two bases (25, 26) of the coated optical fiber housing 2 will be described with reference to FIG. 4(B).

For example, the interior of the closure is a space enclosed by a cylindrical main body 1 having an open top surface, and a cylindrical lid 3 for sealing the top surface of the main body 1. Further, the coated optical fiber housing 2 has a truncated cone shape.

The coated optical fiber housing 2 is installed inside the main body 1 so that the cable insertion hole 21, which is the base with the smaller area of the two bases, is closer to the bottom surface 13 of the main body 1 than the other base, and the cable insertion hole 21 is not in contact with the bottom surface 13 of the main body 1.

The main body cable insertion hole 11 is formed on a side surface of the main body 1 at a position closer to the bottom surface 13 of the main body 1 than a position of the cable insertion hole 21 of the coated optical fiber housing 2.

A cable fixture 23 fixes the optical fiber cable 4 inserted through the main body cable insertion hole 11 and the cable insertion hole 21 from the exterior, on the lid 3 side of the coated optical fiber housing 2.

Figure 4:
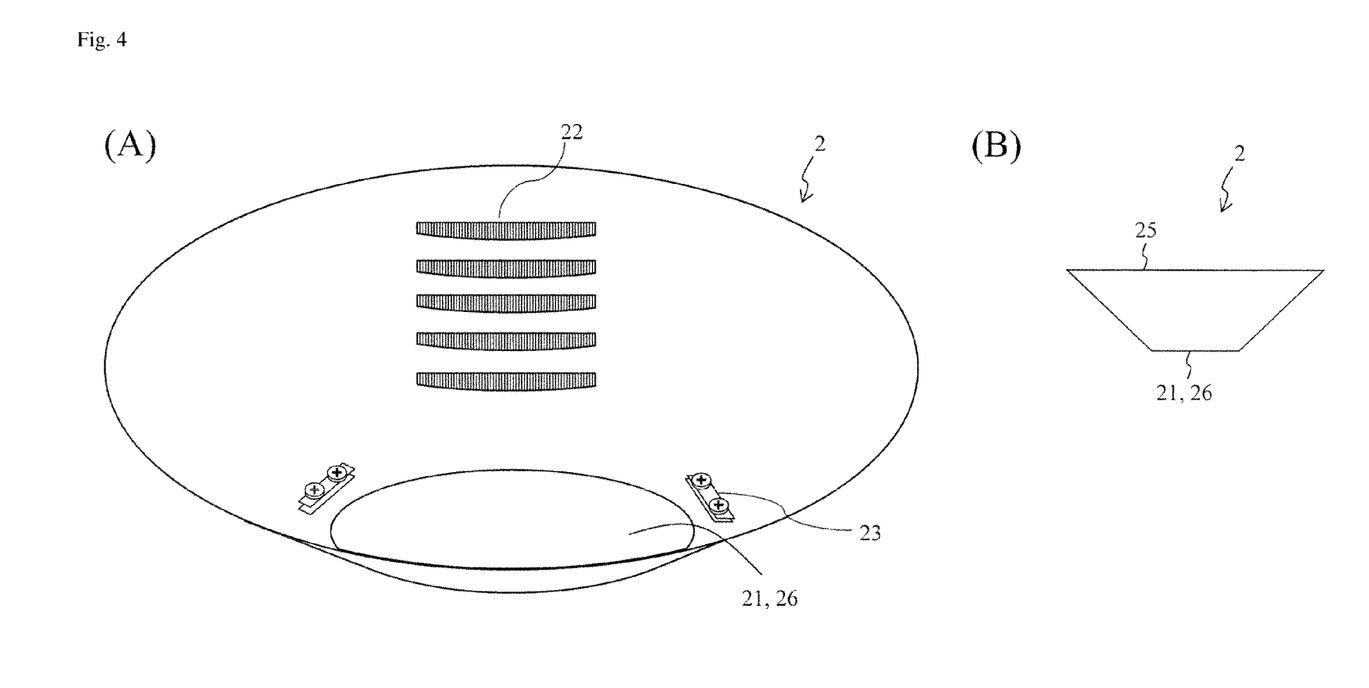
FIG. 4 is a diagram illustrating a structure of a coated optical fiber housing in which a cable is inserted and a coated optical fiber is housed.

FIG. 4 is a schematic diagram illustrating the coated optical fiber housing 2. FIG. 4(A) is a perspective view, and FIG. 4(B) is a side view. In the coated optical fiber housing 2, the base with the smaller area of the two bases (25, 26) is arranged on the road 50 side and is used as the cable insertion hole 21. The coated optical fiber housing 2 includes a connection point fixing section 22 for fixing the connection part 42 on the lid 3 side.

The closure includes the cylindrical main body 1 as illustrated in FIGS. 1 to 3. The closure includes the conic solid-shaped coated optical fiber housing 2. A tip of the coated optical fiber housing 2 is installed so as to face the road 50 and the cable insertion hole 21 is provided at the tip of the coated optical fiber housing 2, so that even when water enters the coated optical fiber housing 2, the water can be easily drained from the cable insertion hole 21. Further, the coated optical fiber housing 2 is installed so as to have a gap between the coated optical fiber housing 2 and the bottom surface 13 of the main body 1, thus improving a drainage performance. The coated optical fiber housing 2 is only required to be a conic solid and does not necessarily have a conical shape as illustrated in FIG. 2.

Figure 5:
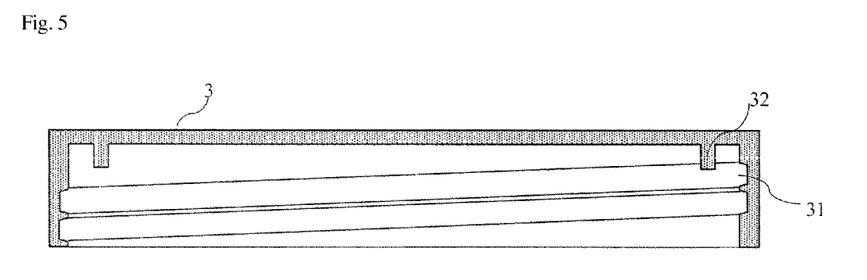
FIG. 5 is a longitudinal sectional view of a lid screwed with the main body.
Figure 6:
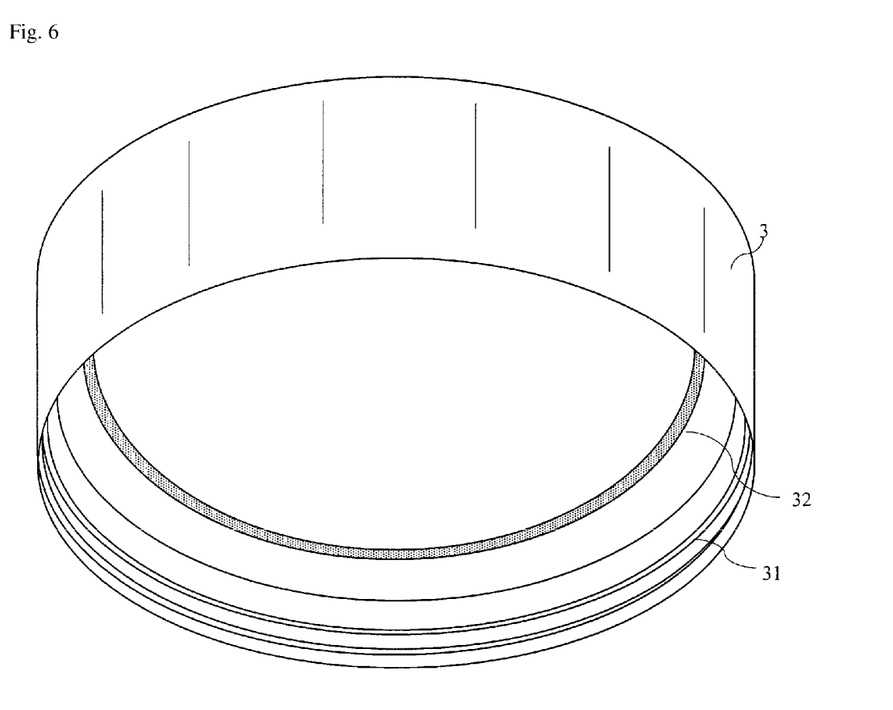
FIG. 6 is a perspective view of the lid screwed with the main body.

FIGS. 5 and 6 are diagrams for illustrating the lid 3. FIG. 5 is a longitudinal sectional view of the lid 3, and FIG. 6 is a perspective view of the lid 3. The lid 3 has a cylindrical shape similar to the main body 1, and the inside of the lid 3 has a hollowed-out structure. A thread 31 is provided inside the lid 3 and are screwed with a thread of a lid installation part 12 provided on the main body 1. A worker can open and close the closure in a short time by rotating the lid 3 without using any special tool.

At least one of the main body 1 or the lid 3 has a sealing material 32 that adheres to the main body 1 and the lid 3 when the main body 1 and the lid 3 are screwed with each other. As illustrated in FIGS. 5 and 6, the sealing material 32 is provided inside the lid 3. The sealing material 32 is provided in an annular shape and adheres to the upper opening of the main body 1 when the lid 3 is screwed with the main body 1. The sealing material 32 prevents water from entering the coated optical fiber housing 2 from the lid 3. In addition, since the sealing material 32 limits the air vent from the second space 35 to the housing cable insertion hole 21, and the housing cable insertion hole 21 faces the road 50, even when the closure is temporarily submerged in water, water immersion into the coated optical fiber housing 2 and the second space 35 is prevented. In the embodiment, an example in which the sealing material 32 is installed on the lid 3 is described, but the sealing material may be installed on the main body 1 or installed on both the main body 1 and the lid 3.

The closure structurally achieves the prevention performances of water immersion and drainage of the coated optical fiber housing 2, and the closure prevents water from staying in the coated optical fiber housing 2 for a long time when installed on the road 50, thereby reducing the time when the coated optical fiber 41 is exposed to water. Even when the lid 3 does not adhere to the main body 1 and the water immersion prevention performance is impaired, it is possible to reduce the time when the coated optical fiber 41 is exposed to water due to the drainage performance.

Figure 7:
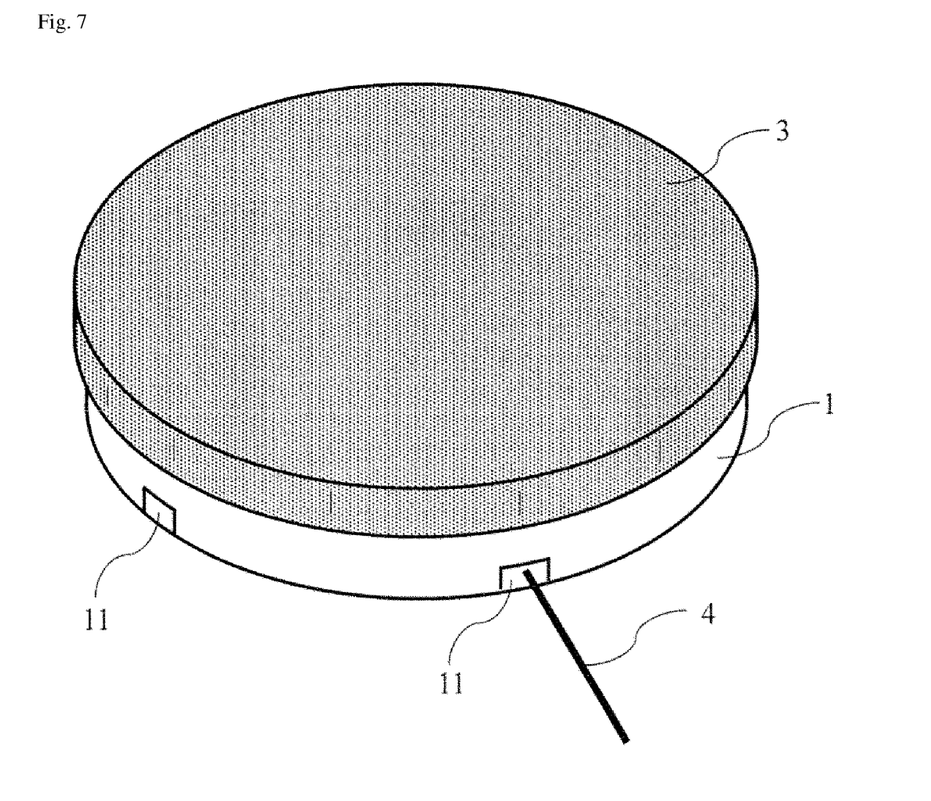
FIG. 7 is a perspective view of the closure according to the present disclosure.

FIG. 7 is a perspective view for describing the closure. The optical fiber cable 4 installed on the road 50 can be inserted from the main body cable insertion hole 11, fixed, and connected to another optical fiber cable 4. A plurality of main body cable insertion holes 11 are provided, from which a plurality of optical fiber cables 4 may be inserted. The plurality of main body cable insertion holes 11 do not necessarily have to be installed facing each other, nor are the plurality of optical fiber cables necessarily inserted into the coated optical fiber housing 2 facing each other.

To further improve the water immersion prevention performance, the main body cable insertion hole 11 may be sealed after the cable is inserted, but even when the seal is broken due to deterioration or the like, the structural flood prevention performance of the present invention is not impaired.

As illustrated in FIG. 2, the inserted optical fiber cable 4 is pulled through the housing cable insertion hole 21 of the coated optical fiber housing 2 into the second space 35 and is fixed to the coated optical fiber housing 2 with the cable fixture 23. Further, the coated optical fiber 41 is taken out from the optical fiber cable 4. The connection point fixing section 22 is provided on the coated optical fiber housing 2. The optical fiber connection point 42 to which the coated optical fibers 41 of the different optical fiber cables 4 are connected can be fixed to the connection point fixing section 22. The connection point 42 may be either a connector shape or a fused sleeve.

The above embodiments are not intended to limit the present invention but may be changed or improved without departing from the spirit of the present invention and include equivalents thereof.

APPENDIX

It is known that the optical fibers lose strength when exposed to water for a long time. A closure of the present invention can house optical fiber cables installed on a road, a coated optical fiber housing has a cable insertion hole at a bottom thereof, the coated optical fiber housing being installed to secure a gap between the coated optical fiber housing and a bottom surface of a main body, the coated optical fiber housing having a conic solid shape with a tip thereof facing the ground, and the cable insertion hole is provided at the tip of the coated optical fiber housing so that water can be drained from the cable insertion hole when water enters the coated optical fiber housing.

A lid of the closure has a cylindrical shape, can be screwed with the main body with threads, and can be opened and closed in a short time, which reduces the work time on the road where work in a short time is required can be shorten, especially to avoid obstructing traffic and to ensure the safety of work.

In addition, the lid can be made to adhere to the main body by having a sealing material inside thereof, which restricts the air vent from the space above the coated optical fiber housing to the cable insertion hole. Since the cable insertion hole faces the ground, even when the closure of the present invention is temporarily submerged in water, the water is prevented from entering the coated optical fiber housing and the upper part thereof, thereby reducing the time when the optical fiber is exposed to water.

REFERENCE SIGNS LIST

1 Main body
11 Main body cable insertion hole
12 Lid installation part
13 Main body bottom surface
15 First space
2 Coated optical fiber housing
21 Housing cable insertion hole
22 Connection point fixing section
23 Cable fixing part
25 Base
26 Base
3 Lid
31 Thread
32 Sealing material
35 Second space
4 Optical fiber cable
41 Coated optical fiber
42 Optical fiber connection point
50 Road

The invention claimed is:

1. A closure for protecting a connection part that connects a coated optical fiber enclosed in an optical fiber cable with another coated optical fiber enclosed in another optical fiber cable, the closure comprising:
   a coated optical fiber housing configured to divide an interior of the closure into a first space that is on a side of the interior nearer to a road and has a main body cable insertion hole for inserting the optical fiber cables from an exterior and a second space that is on an opposite side of the interior farther from the road and includes the connection part, wherein
   the coated optical fiber housing has a frustum shape with two bases each open, a base with a smaller area of the two bases protruding toward the road, and
   the base with the smaller area of the two bases is a cable insertion hole for inserting the optical fiber cables from the first space into the second space and is not in contact with a bottom surface of the first space.

2. The closure according to claim 1, wherein
the interior of the closure is
a space enclosed by
a main body that is cylindrical which has a top surface open and a lid that is cylindrical which is configured to seal the top surface of the main body,
the coated optical fiber housing has a truncated cone shape, and
the main body and the lid have respective threads which enable the lid to be screwed to the main body.

3. The closure according to claim 2, wherein
at least one of the main body or the lid has a sealing material configured to adhere to the main body and the lid when the main body and the lid are screwed with each other.

* * * * *